US012555723B2

(12) United States Patent
Beagen et al.

(10) Patent No.: US 12,555,723 B2
(45) Date of Patent: Feb. 17, 2026

(54) ELECTRIC POWER DISCONNECT SWITCH WITH INTEGRATED BYPASS SWITCH

(71) Applicant: Southern States LLC, Hampton, GA (US)

(72) Inventors: Lawrence B Beagen, Fayetteville, GA (US); Joseph Andreyo, Fayetteville, GA (US)

(73) Assignee: SOUTHERN STATES, LLC, Hampton, GA (US)

( * ) Notice: Subject to any disclaimer, the term of this patent is extended or adjusted under 35 U.S.C. 154(b) by 236 days.

(21) Appl. No.: 18/532,509

(22) Filed: Dec. 7, 2023

(65) Prior Publication Data

US 2025/0191857 A1 Jun. 12, 2025

(51) Int. Cl.
*H01H 9/26* (2006.01)
*H01H 1/00* (2006.01)

(52) U.S. Cl.
CPC ............ *H01H 9/26* (2013.01); *H01H 1/0015* (2013.01); *H01H 2009/265* (2013.01)

(58) Field of Classification Search
CPC .. H01H 9/26; H01H 1/0015; H01H 2009/265; H01H 33/66207; H01H 33/022; H01H 33/42; H01H 33/662; H01H 2033/6623; H01H 2033/6665; H01H 33/143; H01H 33/14; H01H 31/30; H01H 9/047; H01H 1/00
See application file for complete search history.

(56) References Cited

U.S. PATENT DOCUMENTS 2,809,244 A * 10/1957 Owens .................. H01H 31/28 200/325
2022/0189710 A1* 6/2022 Kowalik .................. H02B 5/00

* cited by examiner

*Primary Examiner* — Lheiren A Caroc
(74) *Attorney, Agent, or Firm* — Mehrman Law Office; Michael J. Mehrman

(57) ABSTRACT

A disconnect switch including a main disconnect switch integrated with a bypass switch. The purpose of he bypass switch is to provide a parallel path for temporarily closing the disconnect switch so that the main disconnect switch can be tested (i.e., opened and closed) without interrupting the power flow through disconnect switch. The bypass switch is integrated with the main disconnect switch and supported by the same insulator structure, which avoids duplication of parts and provided for a compact unit suitable for deployment on a pole or other mounting structure outside a substation. The bypass switch also includes a frame-mounted linkage at ground voltage operated by an actuator at ground voltage, which avoids the use of "hot sticks" to operate the bypass stitch.

7 Claims, 10 Drawing Sheets

ELECTRIC POWER DISCONNECT SWITCH WITH INTEGRATED BYPASS SWITCH

TECHNICAL FIELD

The present invention is directed to electric power systems and, more particularly, to an electric power disconnect switch with an integrated bypass switch.

BACKGROUND OF THE INVENTION

Electric power disconnect switches are used to isolate electric equipment for testing, repair and other procedures. The utility company has a need to regularly operate a disconnect switch to verify that the switch itself is operating properly. Regular switch operation is also necessary to maintain lubrication of the bearings and other live parts of the switch. A prolonged lack of switch operation can lead to poor lubrication, corrosion of parts, premature switch failure and associated costs and power service outages. Unless there is a backup power source in place, operating the disconnect switch to test and verify proper operation of the switch interrupts the electric power supply to the equipment served by the disconnect switch. In many cases, the disconnect switch supplies power to critical loads, which increases need to minimize electric service interruption. Without a backup power option in place, this makes it difficult for the utility company to test the disconnect switch on a regular basis.

One conventional approach for disconnect switch testing involves building parallel disconnect switches on separate insulator structures so that any single switch can be taken out of service without interrupting the power flow. This solution is expensive and impractical, especially for disconnect switches located outside of substations where installing separate insulator structures for parallel disconnect switches is often impractical. Another conventional approach includes a bypass switch added to a disconnect switch operated by a technician using a "hook stick" from a bucket truck. This approach is also expensive and requires putting personnel at risk in tall bucket trucks operating height voltage equipment in potentially hazardous conditions. A need therefore exists for improved techniques for testing disconnect switches without interrupting electric service to loads served by the disconnect switches.

SUMMARY THE INVENTION

The invention may be embodied an electric power disconnect switch with integrated bypass switch. The disconnect switch incudes a frame at a ground voltage and an insulator structure having a ground voltage end connected to the frame and a line voltage end spaced apart from the ground voltage end. A main disconnect switch and an integrated bypass switch are supported by the line voltage end of the same insulator structure. A bypass switch drive linkage is supported by the frame at ground voltage. An insulated link is connected between the bypass switch at the line voltage and the frame at the ground voltage. An actuator at the ground voltage operates the bypass switch drive linkage to open and close the bypass switch independently of the main disconnect switch.

In a representative embodiment, the main disconnect switch includes a main disconnect linkage, a main disconnect receiver, and a main disconnect blade selectively movable into and out of connection with the main disconnect receiver to open and close the main disconnect switch. The bypass switch includes a bypass switch linkage integrated with the main disconnect linkage, a bypass switch receiver integrated with the main disconnect receiver, and a bypass switch blade selectively movable into and out of connection with the bypass switch receiver to open and close the bypass switch independently of the main disconnect switch. The insulator structure may include a drive insulator, a guide insulator and a receiver insulator. In this embodiment, the drive insulator and the guide insulator support the main disconnect linkage and the bypass switch linkage, while the receiver insulator supports the main disconnect receiver and the bypass switch receiver.

A gang-operated electric power disconnect switch includes a first electric power disconnect switch including a first main disconnect switch with a first integrated bypass switch, a second electric power disconnect switch including a second main disconnect switch with a second integrated bypass switch, and an actuator for simultaneously operating the first and second integrated bypass switches independently of the first and second main disconnect switches.

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DETAILED DESCRIPTION

The invention may be embodied in a disconnect switch including a main disconnect switch integrated with a bypass switch. The purpose of he bypass switch is to provide a parallel electric path for temporarily closing the disconnect switch so that the main disconnect switch can be tested (i.e., opened and closed) without interrupting the power flow through disconnect switch. The bypass switch is integrated with the main disconnect switch and supported by the same insulator structure, which avoids duplication of parts and provides for a compact unit suitable for deployment on a pole or other mounting structure outside a substation. The disconnect switch achieves several advantages over conventional bypass switch arrangements. The insulated link allows the bypass switch to be operated from ground voltage, which is an improvement over conventional "hot stick" operation requiring manual operation of the bypass switch at high voltage. The main disconnect switch and the bypass switch are both supported by the common insulator structure, which avoids the use of separate insulator structures commonly used in conventional bypass switch configurations. The disconnect switch is therefore convenient for installation on poles and other structures outside of substations.

The disconnect switch includes an insulator structure with a ground voltage end connected to ground voltage equipment and a line voltage end connected to line voltage equipment. The line voltage equipment includes a main disconnect switch and a bypass switch connected in parallel. The main disconnect switch includes a main disconnect blade linkage for opening and closing the main disconnect switch, while the bypass switch includes a bypass switch blade linkage for opening and closing the bypass switch. The ground voltage equipment includes a frame supporting the insulator structure, a main disconnect drive linkage, and a bypass switch drive linkage. A main disconnect switch actuator is connected to the main disconnect drive linkage for opening and closing the main disconnect switch. An insulated link is connected between the bypass switch drive linkage at ground voltage and the bypass switch blade linkage at line voltage. A bypass switch actuator is connected to the bypass drive linkage for opening and closing the bypass switch from ground voltage independently of the main disconnect switch.

Figure 1:
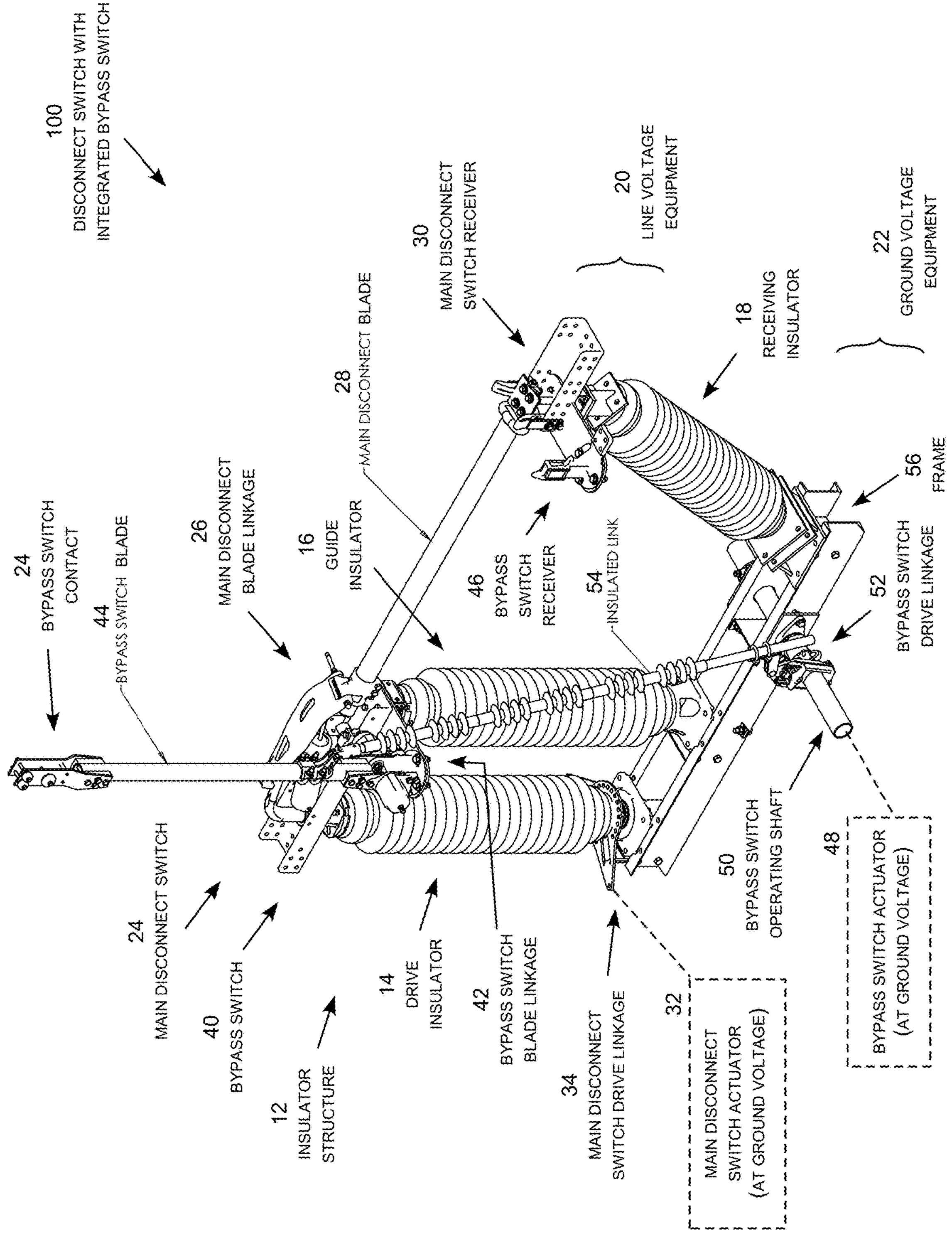
FIG. 1 is a perspective view of an electric power disconnect switch with a main disconnect switch closed and a bypass switch open.
Figure 2:
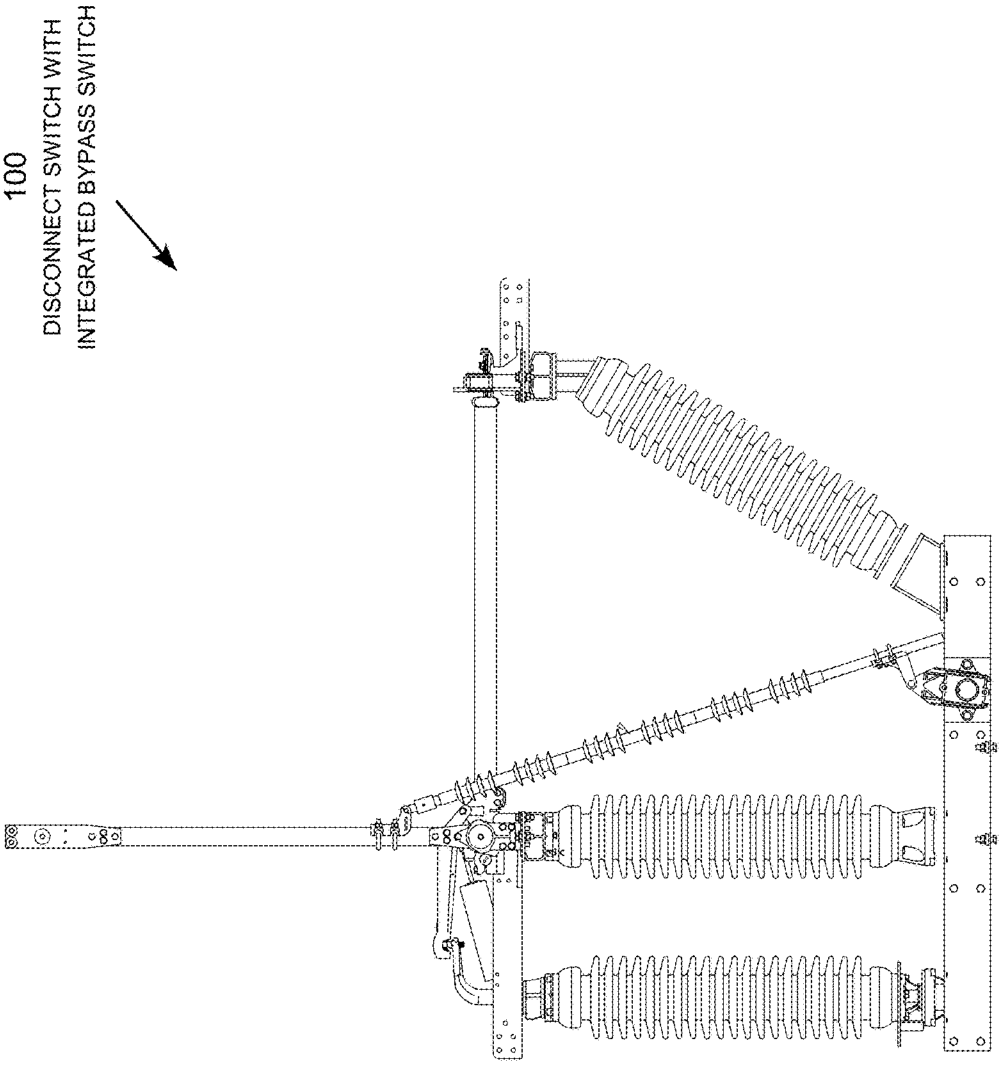
FIG. 2 is a side view of the electric power disconnect switch with the main disconnect switch closed and the bypass switch open.

FIG. 1 is a perspective view and FIG. 2 is a side view of an electric power disconnect switch 100 with a main disconnect switch 24 closed and a bypass switch 40 open. The disconnect switch 100 includes a insulator structure 12 that includes a line voltage end spaced apart form a ground voltage end. In this particular example, the insulator structure 12 includes a drive insulator 14, a guide insulator 16, and a receiving insulator 18 that each include a line voltage end spaced apart from a ground voltage end. The line voltage ends of the drive, guide and receiving insulators are collectively referred to as the line voltage end of the insulator structure 12, while the ground voltage ends of the drive, guide and receiving insulators are collectively referred to as the ground voltage end of the insulator structure. The line voltage end of the insulator structure 12 supports line voltage equipment 20, which is selectively energized to line voltage. The ground voltage end of the insulator structure is connected to ground voltage equipment 22, which remains at ground voltage regardless of switching state of the disconnect switch.

The line voltage end of the insulator structure 12 supports a main disconnect switch 24, which includes a main disconnect blade linkage 26 that moves a main disconnect blade 28 into and out of connection with a main disconnect switch receiver 30. A main disconnect switch drive actuator 32 rotates a main disconnect switch drive linkage 34, which rotates the drive insulator 14, which operates the main disconnect blade linkage 26 to open and close the main disconnect switch. As this portion of the disconnect switch 100 may be conventional it will not be described further.

The innovation resides in the bypass switch 40, which is integrated with the main disconnect switch 32 and supported by the same insulator structure 12. The bypass switch 40 includes bypass switch blade linkage 42 that moves a bypass switch blade 44 into and out of connection with a bypass switch receiver 46. A bypass switch drive actuator 48 rotates a bypass switch operating shaft 50, which moves a bypass switch drive linkage 52, which moves an insulated link 54, which operates the bypass switch blade linkage 42 to open and close the bypass switch 40. The ground voltage end of the insulator structure 12 is supported a frame 60 maintained at ground voltage. The frame 56 also supports the bypass switch operating shaft 50 and the bypass switch drive linkage 52, which are also maintained at ground voltage. Like the insulator structure 12, the insulated link 54 extends between the line voltage equipment 20 and the ground voltage equipment 22 and, therefore, designed to withstand the line voltage. The main disconnect switch actuator 32, which is maintained at ground voltage, operates the main disconnect switch 24, which is selectively energized to line voltage. Similarly, the bypass switch actuator 48, which is maintained at ground voltage, operates the bypass switch 40, which is selectively energized to line voltage.

Figure 3:
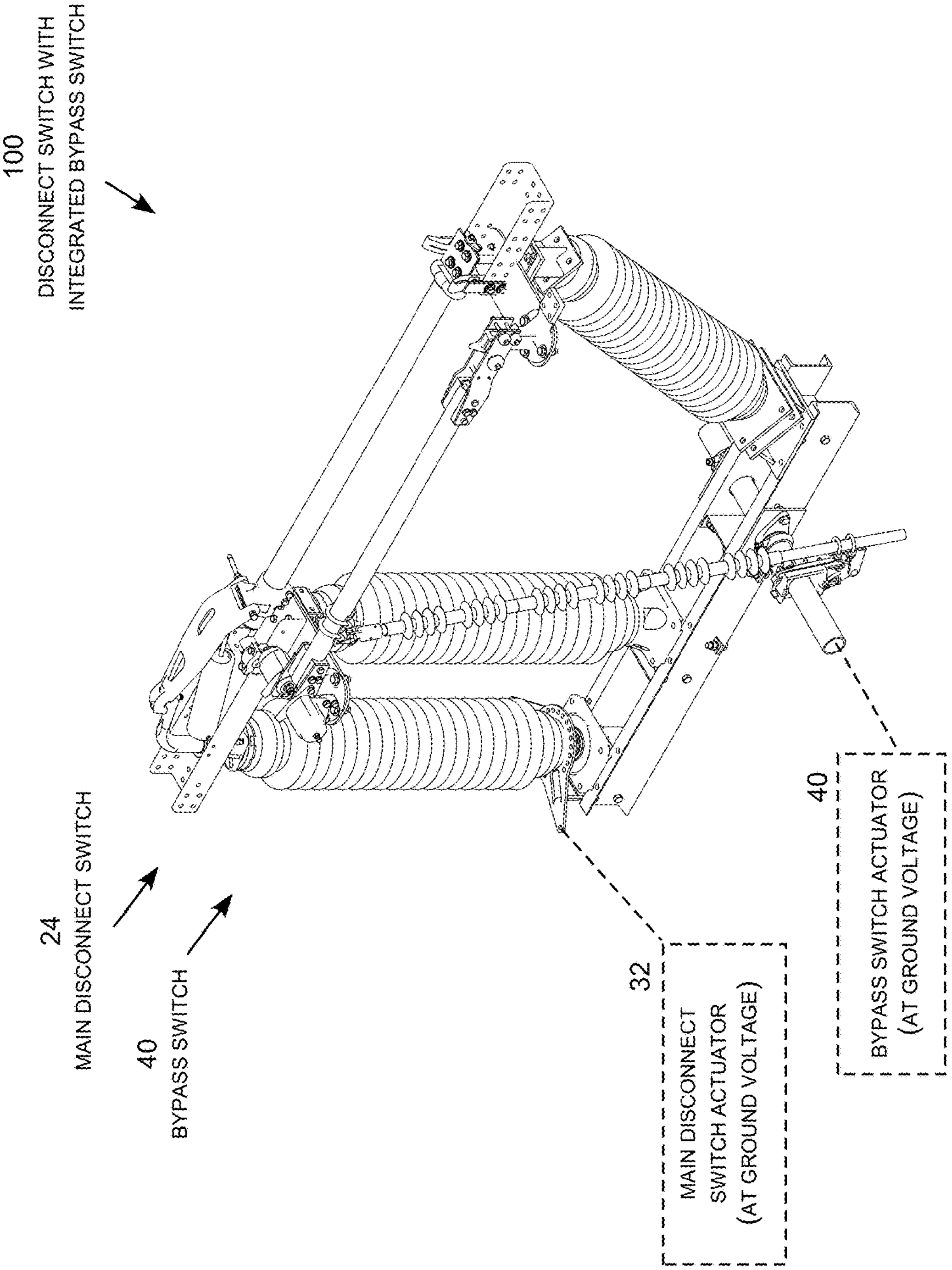
FIG. 3 is a perspective view of the electric power disconnect switch with the main disconnect switch closed and a bypass switch closed.
Figure 4:
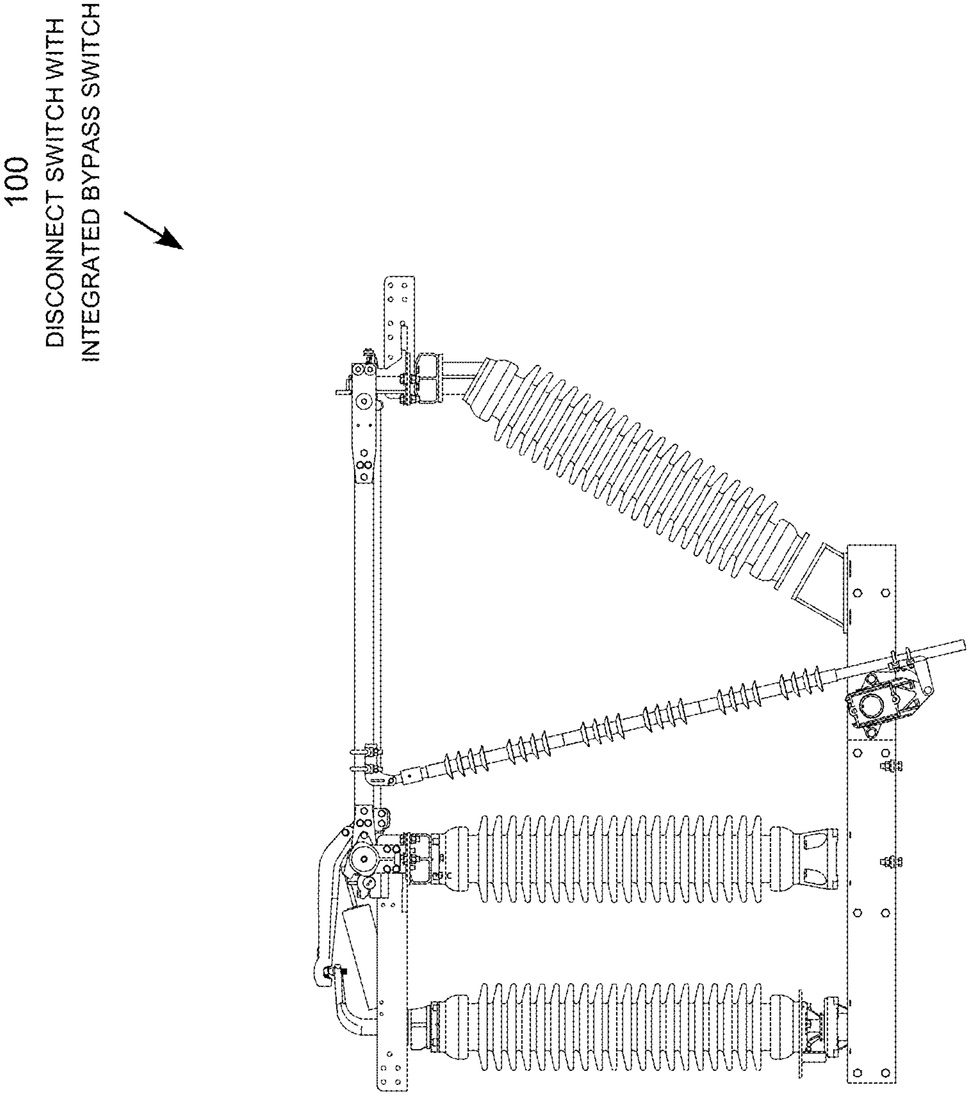
FIG. 4 is a side view of the electric power disconnect switch with the main disconnect switch closed and the bypass switch closed.
Figure 5:
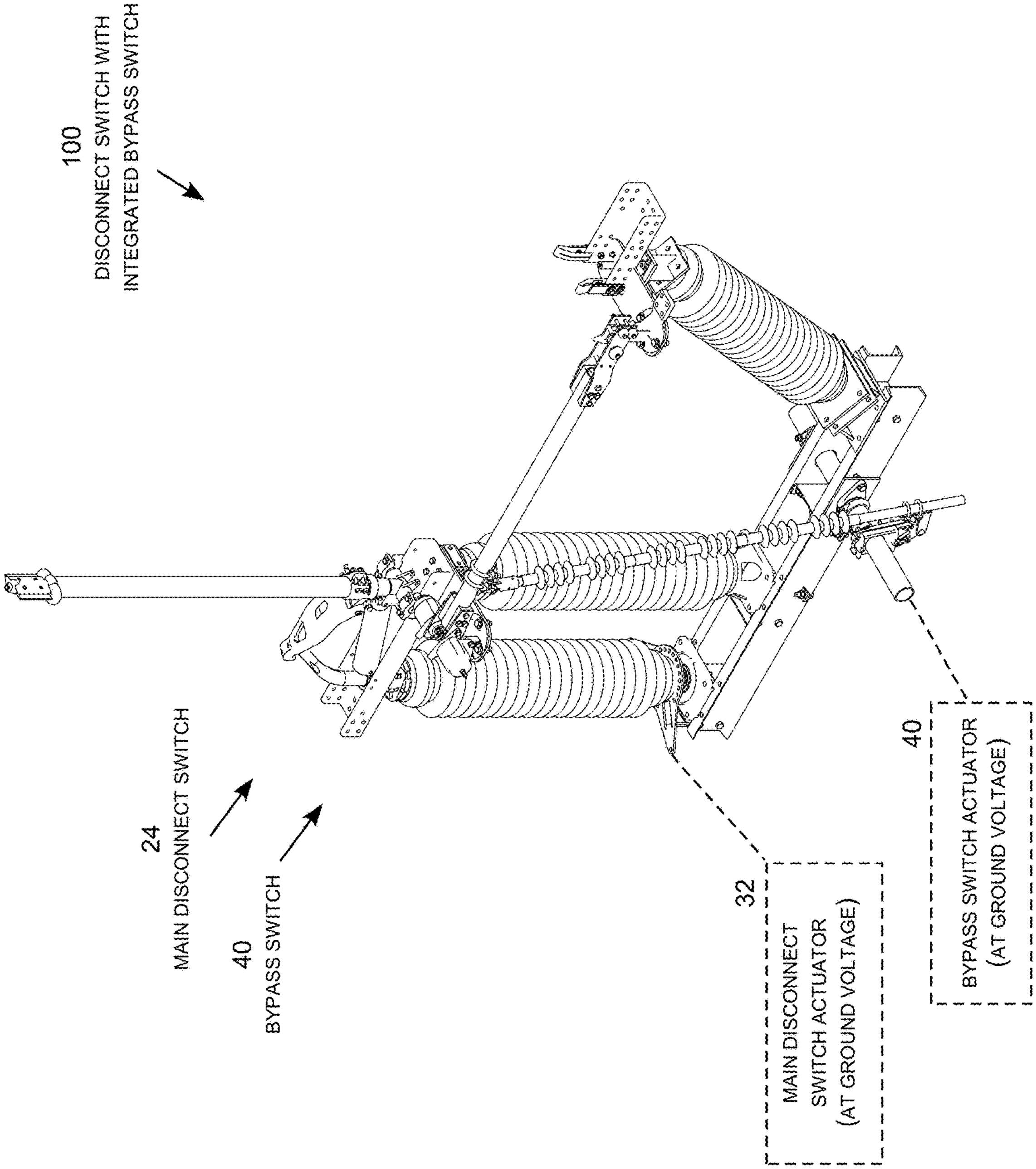
FIG. 5 is a perspective view of the electric power disconnect switch with the main disconnect switch open and a bypass switch closed.
Figure 6:
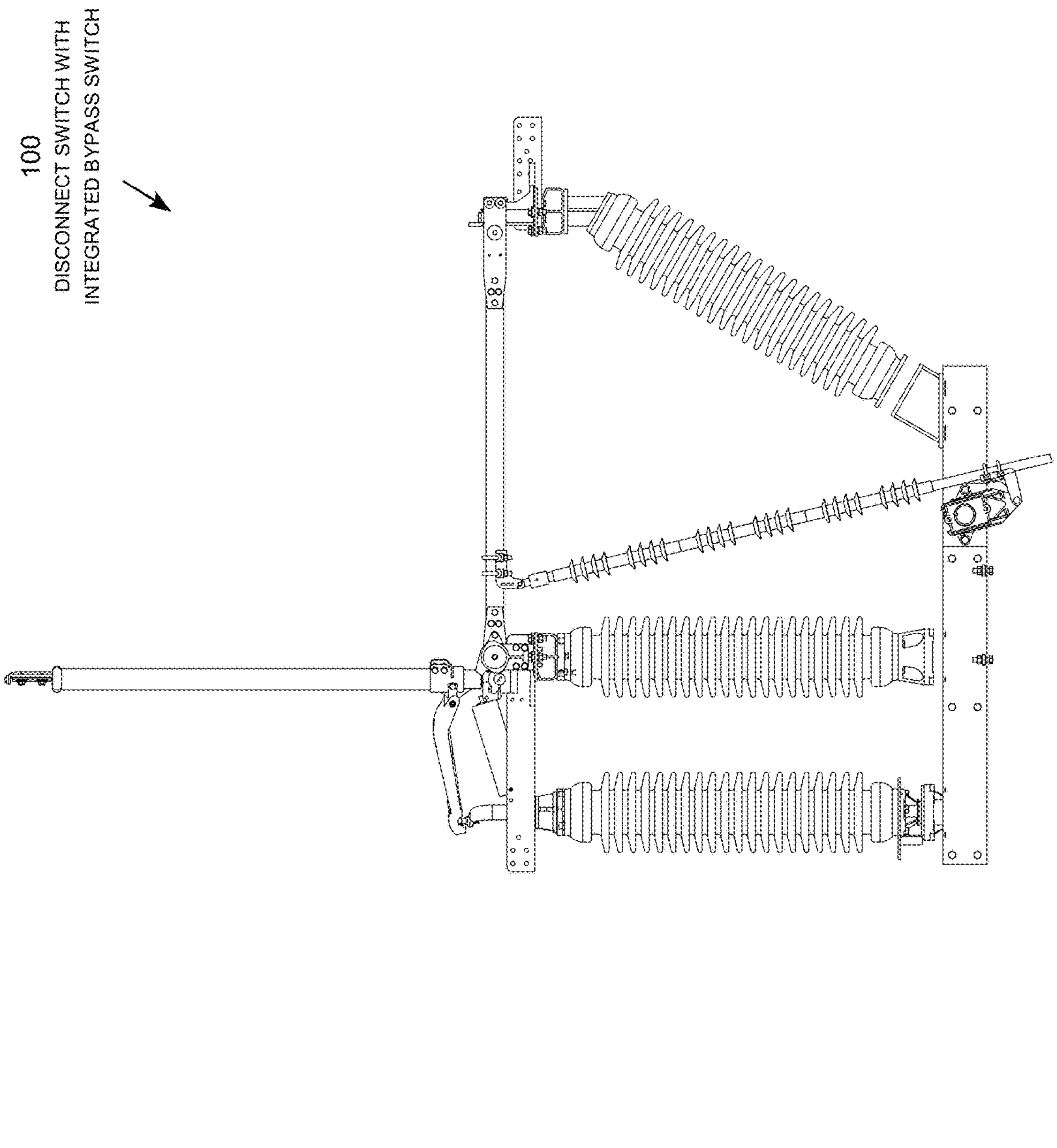
FIG. 6 is a side view of the electric power disconnect switch with the main disconnect switch open and the bypass switch closed.
Figure 7:
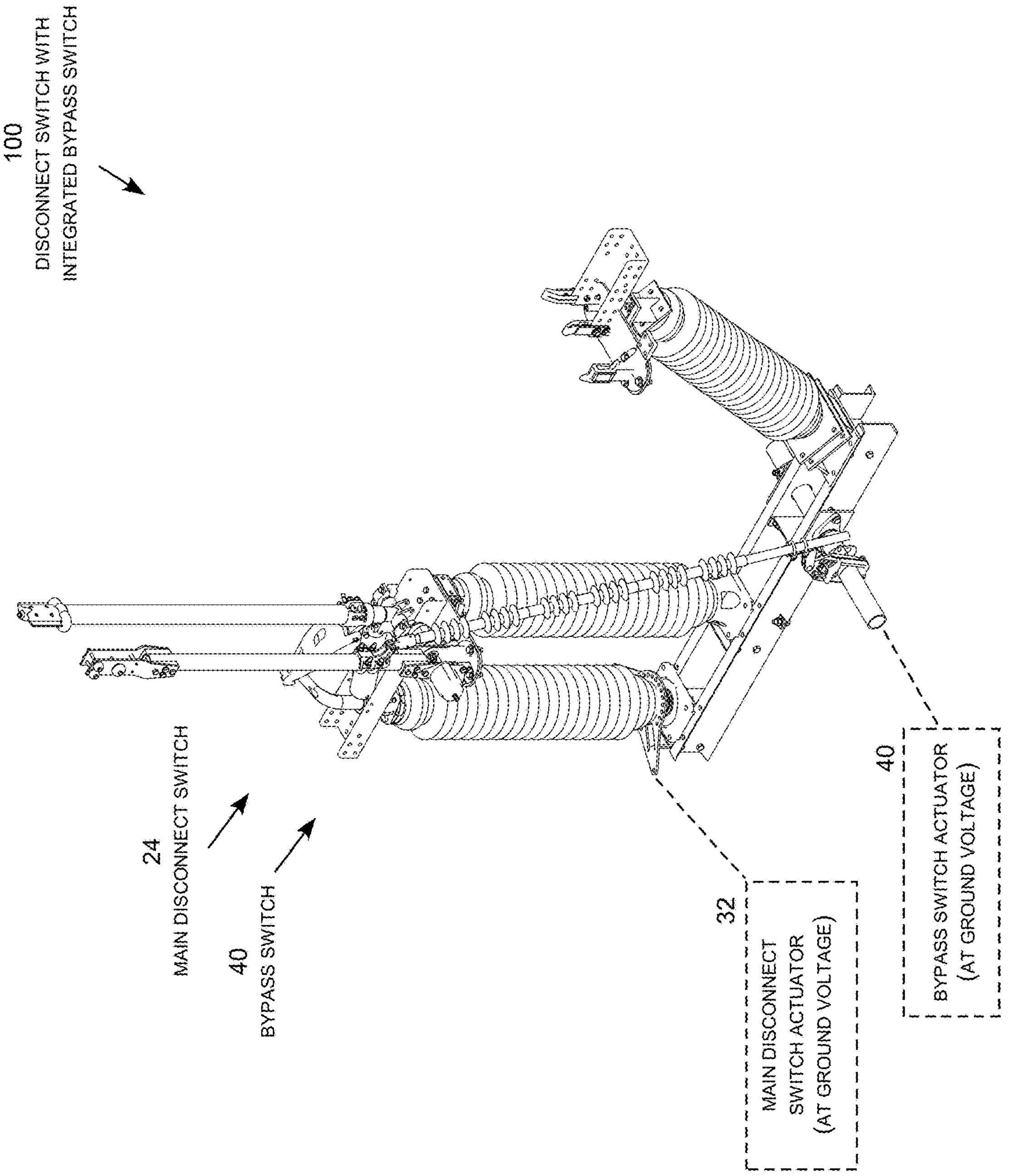
FIG. 7 is a perspective view of the electric power disconnect switch with the main disconnect switch open and a bypass switch open.
Figure 8:
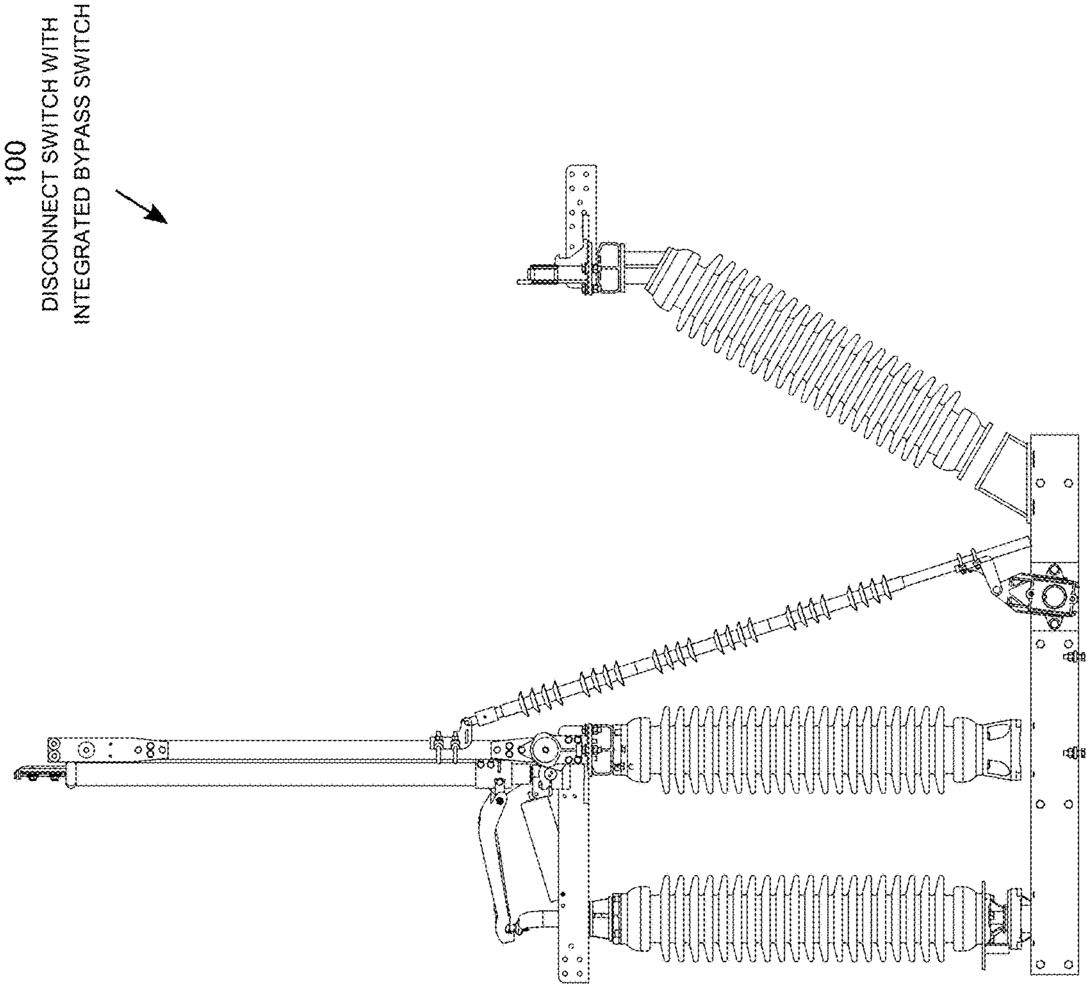
FIG. 8 is a side view of the electric power disconnect switch with the main disconnect switch open and the bypass switch open.

FIGS. 1 and 2 show the disconnect switch 100 in the normal operating condition for this example, in which the main disconnect switch 24 is closed and the bypass switch 40 is open. The purpose of the bypass switch 40 is to provide a parallel electric path for temporarily closing the disconnect switch 100 so that the main disconnect switch 24 can be tested (i.e., opened and closed) without interrupting the power flow through disconnect switch 100. This is illustrated by FIGS. 3 and 4, which show the disconnect switch 100 with the main disconnect switch 24 and the bypass switch 24 both closed creating the parallel electric path through the disconnect switch. Testing of the main disconnect 24 is illustrated by FIGS. 5 and 6, in which the main disconnect switch 24 is opened while the bypass switch 40 remains closed. The main disconnect switch 24 may be opened and closed several times to exercise and lubricate the parts to ensure proper functions. The disconnect switch 100 may then be returned to the normal operating configuration shown in FIGS. 1 and 2. Alternatively, if desired, the FIGS. 6 and 7 illustrate a switch-open configuration in which both the main disconnect switch 24 and the bypass switch 40 are open. Independent operation of the main disconnect switch and the bypass switch allows the disconnect switch 100 to be placed in any of these configurations.

Figure 9:
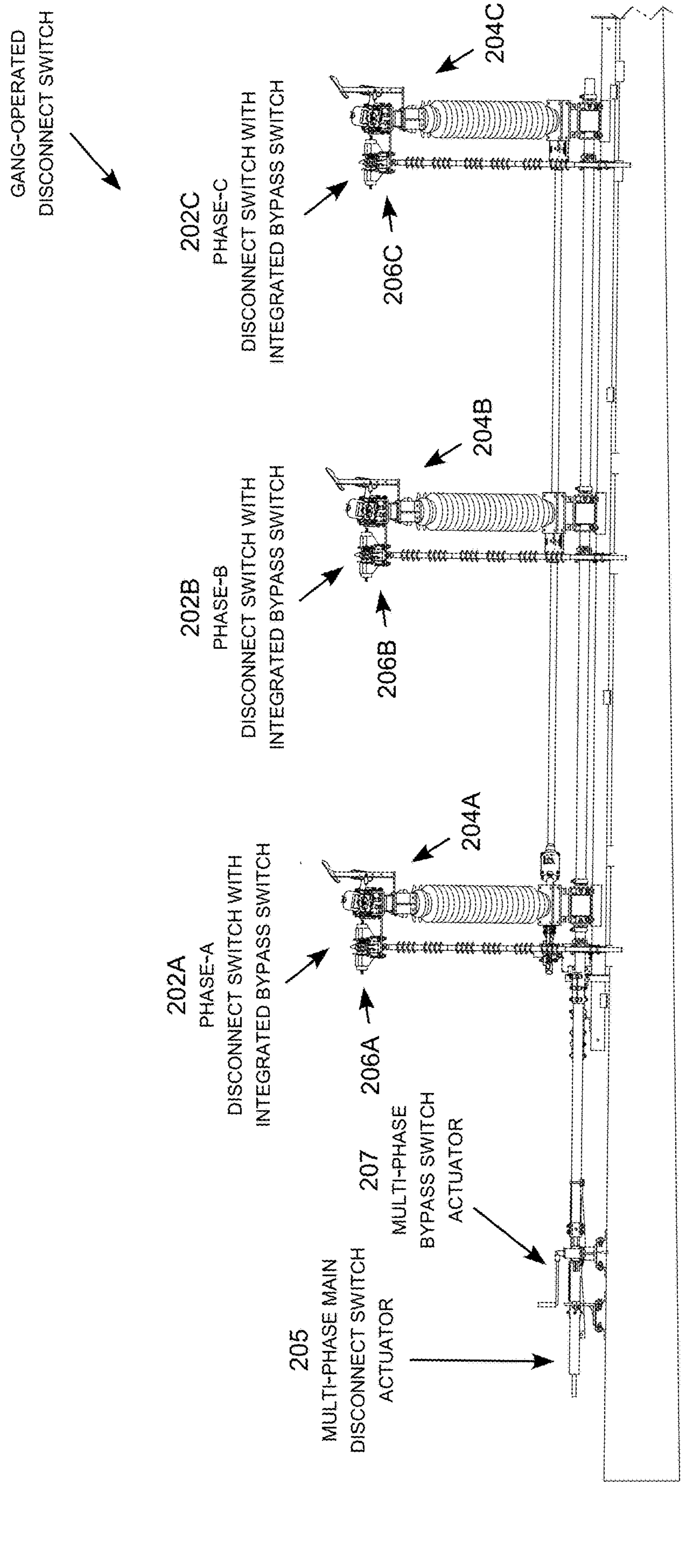
FIG. 9 is a side view of a gang-operated electric power disconnect switch.
Figure 10:
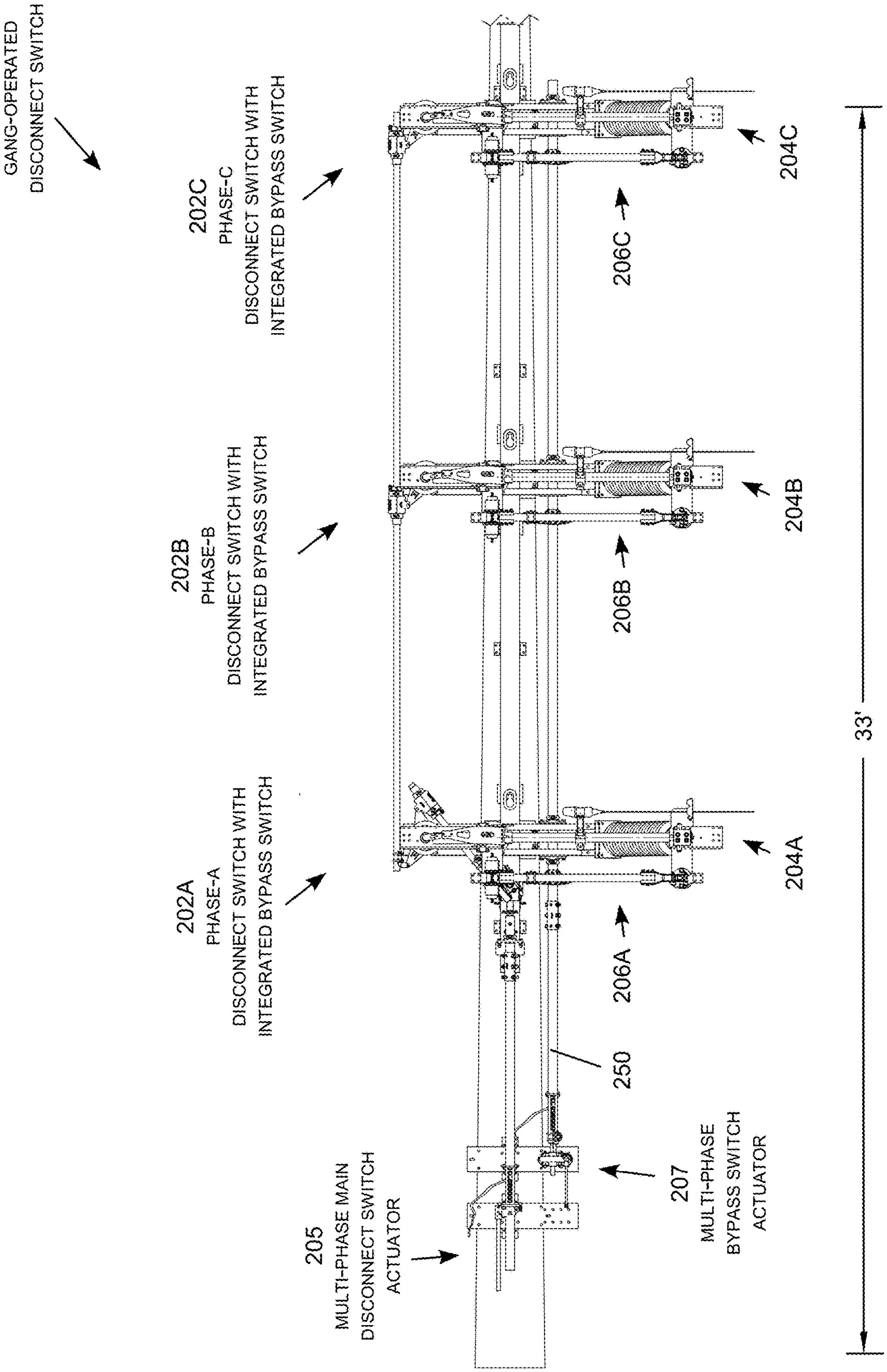
FIG. 10 is a top view of the gang-operated electric power disconnect switch.

FIG. 9 is a side view and FIG. 10 is a top view of a gang-operated electric power disconnect switch 200. This three-phase example includes a phase-A disconnect switch with integrated bypass switch 202A, a phase-B disconnect switch with integrated bypass switch 202B, and a phase-C disconnect switch with integrated bypass switch 202C. These phase disconnect switches may be instances of the single phase disconnect switch 100 described previously with reference to FIGS. 1-8. All three main disconnect switches 204A, 204B and 204C are operated by a multi-phase main disconnect switch actuator 205, which is the gang-operated, multi-phase version of the main disconnect switch actuator 32 shown in FIGS. 1-8 for the single-phase version of the disconnect switch 100. Similarly, all three bypass switches 206A, 206B and 206C are operated by a multi-phase bypass switch actuator 207, which is the gang-operated, multi-phase version of the bypass switch actuator 48 shown in FIGS. 1-8. In this example, the main disconnect switch actuator 205 utilizes a lever, while the multi-phase bypass switch actuator 207 utilizes a manual crank actuator. It will be understood that other types of manual and motorized actuators may be utilized as a matter of design choice.

The particular example of the gang-operated disconnect switch 200 shown in FIGS. 9 and 10 is a 123 kV, 1200 Amp, 3-Phase switch shown substantially to scale with an overall length of about 33' (about 10 meters) as shown in FIG. 10. It will also be understood that the size of the disconnect switch will vary based on the designed voltage and current capacity. The multi-phase bypass switch actuator 207 utilizes a bypass switch operating shaft 250, which is an extended version of the bypass switch operating shaft 50 shown in FIGS. 1-8 for the single-phase version of the disconnect switch 100. Connection of all three bypass switches 206A, 206B and 206C to the common bypass switch operating shaft 250 allows for gang operation of the bypass switches 206A, 206B and 206C by the multi-phase bypass switch actuator 207. Additional disclosure regarding representative disconnect switch and linkage configurations are described in US 2023-0298828, US 2023-0298836, and US 2023-0298827, which are incorporated by reference.

The drawings are in simplified form and are not to precise scale unless specifically indicated. The words "couple" and similar terms do not necessarily denote direct and immediate connections, but also include connections through intermediate elements or devices. Certain descriptors, such "first" and "second," "top and bottom," "upper" and "lower," "inner" and "outer," or similar relative terms may be employed to differentiate structures from each other. These descriptors are utilized as a matter of descriptive convenience and are not employed to implicitly limit the invention to any particular position or orientation. It will also be understood that specific embodiments may include a variety of features and options in different combinations, as may be desired by different users. Practicing the invention does not require utilization of all, or any particular combination, of these specific features or options.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

The invention claimed is:

1. An electric power disconnect switch with integrated bypass switch for an electric power line operating at a line voltage, comprising:

a frame at a ground voltage;

an insulator structure comprising a ground voltage end connected to the frame and a line voltage end spaced apart from the ground voltage end;

a main disconnect switch supported by the line voltage end of the insulator structure;

a bypass switch supported by the line voltage end of the insulator structure connected in parallel with the main disconnect switch;

a bypass switch drive linkage supported by the frame at the ground voltage;

an insulated link connected between the bypass switch at the line voltage and the bypass switch drive linkage at the ground voltage;

an actuator at the ground voltage for operating the bypass switch drive linkage to open and close the bypass switch independently of the main disconnect switch.

2. The electric power disconnect switch of claim 1, wherein:

the main disconnect switch comprises a main disconnect linkage, a main disconnect receiver, and a main disconnect blade selectively movable into and out of connection with the main disconnect receiver to open and close the main disconnect switch;

the bypass switch comprises a bypass switch linkage integrated with the main disconnect linkage, a bypass switch receiver integrated with the main disconnect receiver, and a bypass switch blade selectively movable into and out of connection with the bypass switch receiver to open and close the bypass switch independently of the main disconnect switch.

3. The electric power disconnect switch of claim 2, wherein:

the insulator structure comprises a drive insulator, a guide insulator and a receiver insulator;

the drive insulator and the guide insulator support the main disconnect linkage and the bypass switch linkage; and the receiver insulator supports the main disconnect receiver and the bypass switch receiver.

4. A Gang-operated electric power disconnect switches, comprising:

a first electric power disconnect switch including a first main disconnect switch with a first integrated bypass switch;

a second electric power disconnect switch including a first main disconnect switch with a second integrated bypass switch;

a gang actuator for simultaneously operating the first and second integrated bypass switches independently of the first and second main disconnect switches.

5. The gang-operated electric power disconnect switches of claim 4, wherein the first and second electric power disconnect switches each comprise:

a frame at a ground voltage;

an insulator structure comprising a ground voltage end connected to the frame and a line voltage end spaced apart from the ground voltage end;

a main disconnect switch supported by the line voltage end of the insulator structure;

a bypass switch supported by the line voltage end of the insulator structure connected in parallel with the main disconnect switch;

a bypass switch drive linkage supported by the frame;

an insulated link connected between the bypass switch at the line voltage and the frame at the ground voltage for operating the bypass switch;

an actuator at the ground voltage for operating the bypass switch drive linkage to open and close the bypass switch independently of the main disconnect switch.

6. The gang-operated electric power disconnect switches of claim 5, wherein:

each main disconnect switch comprises a main disconnect linkage, a main disconnect receiver, and a main disconnect blade selectively movable into and out of connection with the main disconnect receiver to open and close the main disconnect switch;

each bypass switch comprises a bypass switch linkage integrated with the main disconnect linkage, a bypass switch receiver integrated with the main disconnect receiver, and a bypass switch blade selectively movable into and out of connection with the bypass switch receiver to open and close the bypass switch independently of the main disconnect switch.

7. The gang-operated electric power disconnect switches of claim 5, wherein:

a first insulator structure comprises a first drive insulator, a first guide insulator, and a first receiver insulator;

the first drive insulator and the first guide insulator support a first main disconnect linkage and a first bypass switch linkage; and a first receiver insulator supports the first main disconnect receiver and the first bypass switch receiver;

a second insulator structure comprises a second drive insulator, a second guide insulator, and a second receiver insulator;

the second drive insulator and the second guide insulator support a second main disconnect linkage and a second bypass switch linkage; and a second receiver insulator supports the second main disconnect receiver and the second bypass switch receiver.

* * * * *